United States Patent Office 2,891,125
Patented June 16, 1959

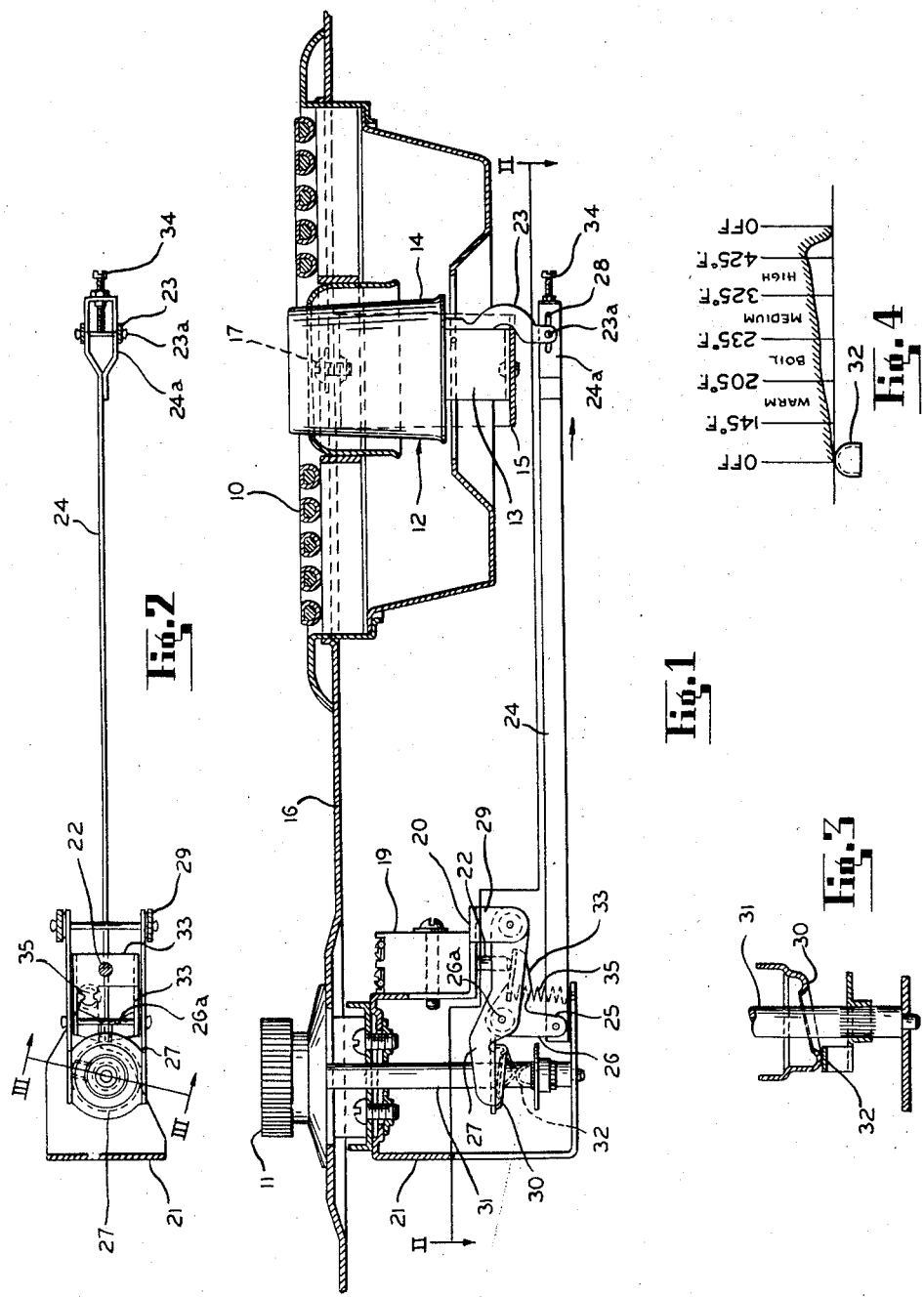

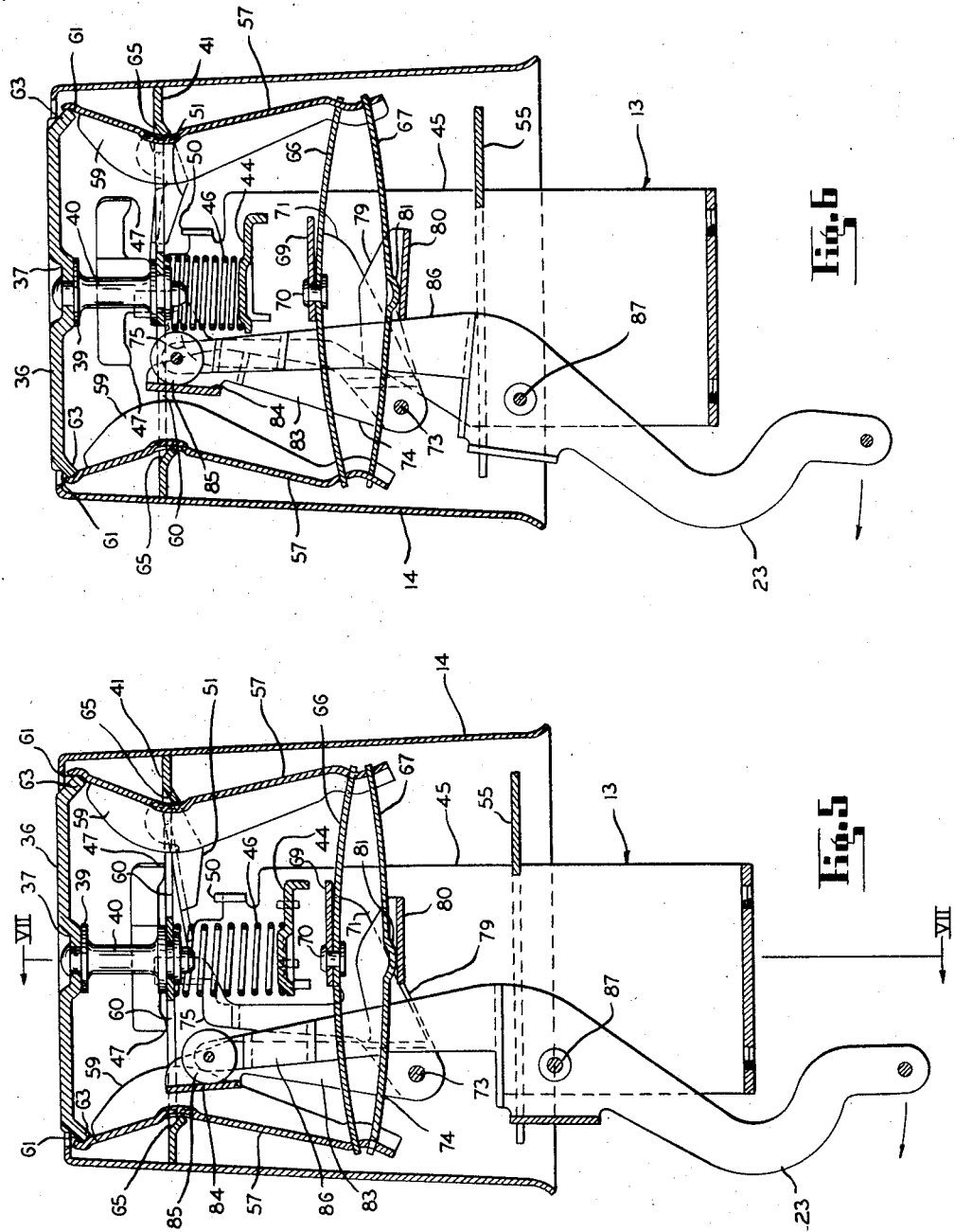

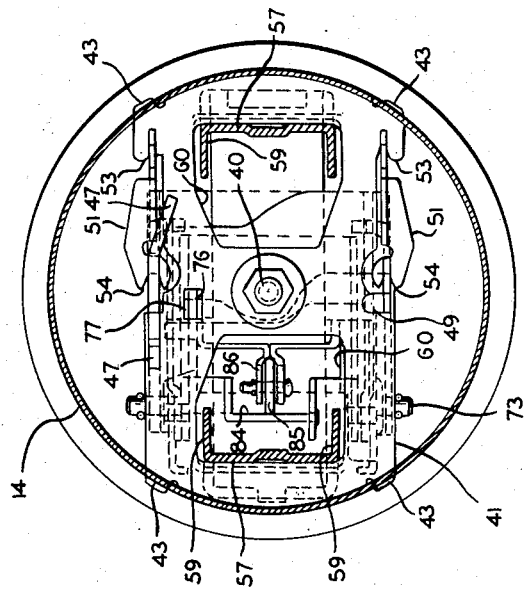

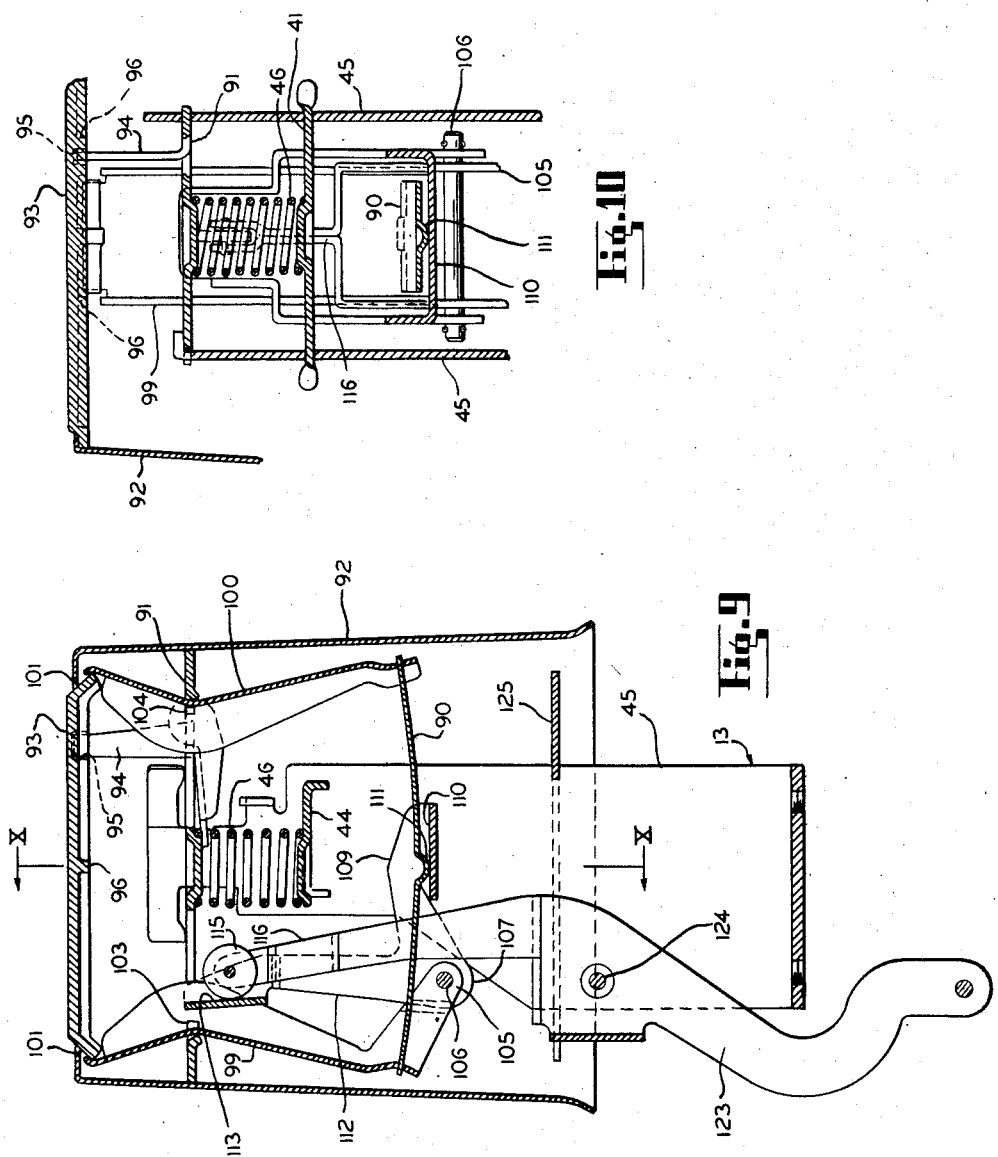

2,891,125

AUTOMATIC HEAT CONTROL APPARATUS FOR COOKING

Nicholas Miller, Chicago, Ill., assignor to The Dole Valve Company, Chicago, Ill., a corporation of Illinois Application June 22, 1956, Serial No. 593,243

12 Claims. (Cl. 200—137)

This invention relates to improvements in heat control apparatus and more particularly relates to a novel and improved form of automatic heat control apparatus for top surface cooking on domestic ranges.

A principal object of the invention is to provide a novel and improved form of heat sensing and control apparatus in which the temperature of cooking is controlled by sensing the temperature of the bottom of a cooking vessel.

Another object of the invention is to provide a differential expansion unit floatingly carried to conform to the bottom of a cooking vessel together with motion amplifying means amplifying expansible movement of the expansion unit and operative to control the cooking temperature in accordance with the temperature of the bottom of a cooking vessel.

A further object of the invention is to provide a low cost control for top surface cooking on domestic ranges operating on the differential expansion principle and so constructed and arranged as to provide a more sensitive control not subject to damage in case of over-temperature.

A further object of the invention is to provide a differential expansion sensing unit sensing the heat supplied to a cooking vessel and utilizing the heat of the cooking vessel to produce mechanical work to turn the heat on and off and to maintain the cooking vessel and its contents within predetermined temperature limits.

A still further object of the invention is to provide an automatic control apparatus for surface cooking operating on the differential expansion principle in which a sensing disk is floatingly carried to conform to the bottom of a cooking vessel and has a relatively high coefficient of expansion, in which a reaction member having a negligible coefficient of expansion is spaced from the sensing member, and an amplifying leverage drive connection reacting against the reaction member and operated by expansion of the sensing member is provided to turn the supply of heat to the cooking vessel off and on, so as to maintain the vessel and its contents within predetermined temperature limits.

A still further object of the invention is to provide a yieldably supported differential expansion thermal sensing unit particularly adapted to control the temperature of top surface cooking, in which an amplifying leverage drive connection is provided to produce work from expansion of the sensing member, and is so arranged as to transfer expansible movement of the sensing member without adversely affecting self-aligning movement of the sensing member, to enable the sensing member to readily conform to the contour of the bottom of a cooking vessel and to have more efficient heat sensing contact therewith.

A still further object of the invention is to provide a simple and improved form of differential expansion sensing unit performing work to turn the heat under a cooking vessel on and off, in which the difference in expansion between a sensing disk and a reaction member spaced therefrom is converted to power to operate a heat control device by a leverage system fulcrumed on the reaction member and operated by expansion of the sensing disk and maintained in compressive engagement therewith by buckling means connected to the heat control device by a simple form of amplifying leverage connection, so arranged as not to interfere with free movement of the sensing disk to conform to the bottom of the cooking vessel.

These and other objects of the invention will appear from time to time as the following specification proceeds and with reference to the accompanying drawings wherein:

Figure 1 is a partial fragmentary vertical sectional view taken through a portion of an electric stove showing an electric heating unit and its mounting, with a sensing and heat control apparatus constructed in accordance with my invention associated therewith in position to sense the temperature of the bottom of a cooking vessel placed on the heating unit;

Figure 2 is a horizontal sectional view taken substantially along line II—II of Figure 1;

Figure 3 is a fragmentary sectional view taken substantially along line III—III of Figure 2;

Figure 4 is a development of the temperature control cam;

Figure 5 is a vertical sectional view taken through the heat sensing unit shown in Figure 1, and showing the sensing unit in a retracted condition;

Figure 6 is a view somewhat similar to Figure 5 but showing the sensing unit in an extreme condition of expansion;

Figure 7 is a sectional view taken substantially along line VII—VII of Figure 5;

Figure 8 is a partial fragmentary top plan view of the sensing unit with the sensing disk removed and certain other parts shown in horizontal section;

Figure 9 is a vertical sectional view illustrating a modified form in which my invention may be embodied; and Figure 10 is a partial fragmentary sectional view taken substantially along line X—X of Figure 9.

In Figure 1 of the drawings, I have shown a vertical section through the top of an electric range having on the top thereof a heating unit 10 of a type commonly known as a Calrod heating unit, and a dial knob 11 for selecting the cooking temperature under the control of a heat sensing thermal power device 12, floatingly mounted in the center of the heating unit 10 to be depressed by and to conform to the bottom of a cooking vessel placed on the heating unit.

The heat sensing thermal power device 12 is yieldably or floatingly supported from beneath the top of the stove on an upright support 13 extending beneath a casing or hood 14 for the heat sensing thermal power device, as will hereinafter be more clearly described as this specification proceeds. The support 13 is suitably mounted at its lower end on a bracket 15 extending across the bottom of the heating unit 10 in vertically spaced relation with respect thereto, and upwardly along the outer sides of said heating unit and secured to a top 16 of the stove, as by machine screws 17.

I have also shown a switch 19 secured to a shouldered portion 20 of a bracket 21 suitably secured to and depending from the underside of the stove top 16. The switch 19 may be a normally closed type of switch in which the contacts are open and a circuit to the heating element 10 is interrupted when a plunger 22 of the switch is depressed.

The operative connection from the heat sensing thermal power unit 12 to the switch 19 includes generally a pivoted actuator yoke 23, a tension link 24 pivotally connected to said yoke at one end and connected at its opposite end to a depending arm 25 of a bell crank 26. The bell crank 26 is transversely pivoted to an adjusting lever 27 intermediate the ends of said lever on a pivot pin 26ª. The adjusting lever 27 is pivoted at one end to ears 29 depending from the shouldered portion 20 of the bracket 21 and has at its opposite end an integrally formed downwardly facing adjustment cam 30 extending about a shaft 31 and engaging a follower 32, splined or otherwise secured to said shaft and rotated by turning movement of the knob 11 and shaft 31, to vary the elevation of the pivot for the bell crank 26 and the travel required for a horizontal arm 33 of said bell crank to depress the plunger 22 and deenergize the heating element 10 upon movement of the link 24 in a direction, which in Figure 1, is shown as being to the right.

The actuator yoke 23 extends along opposite sides of a yoke portion 24ª of the link 24 and is connected thereto by a pivot pin 23ª extending through aligned slots 28 in opposite sides of the yoke portion 24ª. An adjusting screw 34 is threaded in the end of the yoke portion 24ª and bears against the pivot pin 23ª, to accommodate the adjustment of the length of the link 24 and to precisely coordinate the parts of the switch operating mechanism with the parts of the heat sensing power device 12.

A tension spring 35 is provided to bias the arm 33 away from the switch plunger 22 and to bias the link 24 and pivoted yoke 23 to the left. The tension spring 35 also serves to bias the adjustment screw 34 into engagement with the pivot pin 23ª and serves as a biasing spring for the heat sensing thermal power device 12, as will more clearly appear as this specification proceeds.

In Figures 1 and 4 the knob 11 and the shaft 31 are shown as being turned to engage the peak of the follower 32 with the high part of the cam 30. In this position, the arm 27 and bell crank 26 will have been raised sufficiently to depress the plunger 22 and shut off the switch 19. As the follower 22 is turned in a direction, which is shown in Figure 1 as being a counterclockwise direction, the follower 32 will move along the slope of the cam 30 to effect lowering of the arm 27 and pivot 26ª. This will gradually increase the movement required for the bell crank 26 to depress the plunger 22 and open the switch 19, and will thus increase the movement at which the burner 10 is shut off. The temperature range of operation of the switch 19, in accordance with the position of the follower 32 along the face of the cam 30 is indicated in the development of the cam shown in Figure 4.

The heat sensing thermal power unit 12 includes generally a heat sensing disk 36 extending slightly above the top of the casing or hood 14 and spaced inwardly therefrom and supported on said hood or casing for movement therewith, as will hereinafter be more fully described. The heat sensing disk 36 may be made from a material having good heat conductivity and a relatively high coefficient of expansion, such as aluminum or magnesium or the various alloys of aluminum or magnesium, or from any other material having good heat conductivity and a high coefficient of expansion.

The heat sensing disk 36 has a recessed central portion 37 defining a projection from the bottom of the disk 36, abutting a flange 39 spaced a slight distance beneath the upper end of a central post 40, and riveted or otherwise secured to said post in abutting engagement with said flange. The post 40 extends from and is supported on a transversely extending reaction member 41 and is suitably secured thereto.

The reaction member 41 is made from a material having a low coefficient of expansion such as Invar, or a like material, and is shown as having spaced tangs 43 formed integrally therewith and extending through registering slots (not shown) formed in the wall of the hood or casing 14, to support said reaction member and the sensing disk 36 on said hood or casing for floating movement therewith.

The casing 14, reaction member 41 and sensing disk 36 are yieldably supported on a compression spring 46 seated on a transverse bridge 44 secured to and extending between spaced vertical side walls 45 of the support 13. The compression spring 46 is seated on the under side of the reaction member 41 at its upper end, concentric with the center of the post 40.

One side wall 45 has spaced stops 47 extending inwardly over the reaction member 41 to limit upward movement thereof. The opposite side wall 45 has an inturned stop 49 between the stops 47. It may be seen from Figures 5, 7 and 8 that the stops 47 and 49 are on the corners of a triangle and that the spring 46 is positioned near the center of gravity of the triangle to provide an even distribution of the reacting forces on the stops and a yielding support for the reaction member 41, sensing disk 36 and casing or hood 14 and the power and amplifying drive members operated thereby, as will hereinafter be more fully described as this specification proceeds. Downward yielding movement of the sensing disk 36 is limited by stops 50 extending inwardly from the side walls 45 of the support 13.

Two spacing members 51 are rockingly connected between the reaction member 41 and the side walls 45 of the support 13 to insure that there is adequate clearance between the side walls 45 of the frame 13 and the reaction member 41, and to minimize the frictional resistance caused by the forces required to operate the switch 19, so the sensing disk may readily be depressed by the weight of the cooking vessel and may return to its extended position by the force of the compression spring 46 when the weight of the cooking vessel is removed therefrom. The spacing members 51 have vertically extending outer end portions which are notched at their outer ends. The notches of said vertically extending outer end portions engage notched portions 53 of the reaction member 41 (Figure 8). Said spacing members also have horizontally extending inner end portions having notches 54 formed therein and having interengagement with recessed portions of the side walls 45 of the support 13. The spacing members 51 thus space the reaction member 41 inwardly of the side walls 45 to have free yielding and tilting movement with respect to the side walls 45 and also transfer the operating forces of the heat sensing power unit to the side walls 45, and prevent binding of the operating parts of the unit, as will hereinafter more clearly appear as this specification proceeds. A stop plate 55 extends between the side walls 45 adjacent the lower end portion of the casing 14, to limit tilting movement of said casing and the sensing disk 36 and to prevent said casing and sensing disk from going beyond extreme tilted positions.

Referring now to the amplifying power drive connection from the sensing disk 36 to the actuator yoke 23 and switch 19, the reaction member 41 being made from a material having a negligible coefficient of expansion, forms stationary fulcrums for two diametrically opposed rigid levers 57. The rigid levers 57 have flanges 59 extending along opposite sides thereof, to retain the rigidity of said levers, and extend through open central portions 60 of the reaction member 41 and have recessed upper end portions 61 having compressive engagement with diametrically opposed downturned edges 63 of the sensing disk 36.

The levers 57 are of a modified V-shaped formation, the peaks of the recessed portions of the V's of which have rocking engagement with opposed downturned inner edge portions 65 of the recessed portion 60 of the reaction member 41, forming knife edge fulcrum points 65 for the rigid levers 57. The lower arms of the rigid levers 57 are longer than the upper arms thereof and extend downwardly within the casing 14 and are shown as being engaged by spaced buckling strips 66 and 67 connected between the said levers and extending through apertured portions thereof, to maintain said levers in engagement with the fulcrum points 65 of the Invar reaction member 41 and in compressive engagement with the downturned edges 63 of the sensing disk 36. The buckling strips 66 and 67 are initially straight and are arched when assembled to exert opposite forces against the two rigid levers 57 and hold said rigid levers in tight compressive engagement with the downturned end or edge portions 63 of the sensing disk 36. The buckling strips 66 and 67 thus form two facing bows or arches, the spans of which when compressed by movement of the lower arms of the rigid levers 57 toward each other, by expansion of the sensing disk 36 with respect to the Invar reaction member 41, will produce a rise in the height of the arch and a shortening of the arch, as shown in Figure 6.

The means for integrating and amplifying the combined movement of the buckling strips 66 and 67, as the lower arms of the rigid levers 57 move toward each other comprises a yoke member 69 extending across and riveted to the upper buckling strip 66 as by a rivet 70. The yoke member 69 has spaced arms 71 extending downwardly from and angularly along the buckling strips 66 and 67 beneath the buckling strip 67, and forming a support for a pivot shaft 73 for a bell crank 74. The yoke member 69 also has a guide arm 75 extending upwardly and inwardly from the shaft 73 and having an inwardly projecting vertically extending guide portion 76 (Figures 7 and 8) slidably extending through a slot 77 in the Invar reaction member 41, and forming a guide for the yoke member 69 and the pivot pin 73, to guide the pivot pin 73 for vertical movement in a straight line path upon buckling of the buckling strips 66 and 67, upon expansion of the sensing disk 36.

The bell crank 74 rockingly mounted on the shaft 73, has spaced arms 79 extending inwardly from the pivot pin 73 along opposite sides of the lower buckling strips 67 and connected together by a bridge member 80, extending beneath the buckling strip 67 and engaging a generally spherical projection 81 extending downwardly therefrom, and herein shown as being formed integrally therewith. The bell crank 74 also has two laterally spaced vertically extending lever arms 83 extending upwardly from the pivot shaft 73 within an open portion 60 of the Invar reaction member 41 and connected together by a generally vertically extending bearing member 84, herein shown as being engaged by a roller 85 carried between spaced vertically extending lever arms 86 of the actuator yoke 23. The yoke 23 is pivoted intermediate its ends between the side walls 45 of the support 13 on a transverse pivot pin 87, shown as being disposed in a horizontal plane beneath the pivot pin 73 and adjacent the lower end portion of the casing or hood 14, when said hood and the sensing disk 36 nd amplifying levers operated thereby are in the vertically extended position shown in Figure 5.

The roller 85 is maintained in rolling engagement with the bearing surface 84 by the tension spring 35 shown in Figure 1. The tension spring 35 also maintains the bridge 80 in engagement with the spherical projection 81 of the lower buckling strip 67.

It may be seen with reference to Figure 5 that when a cooking vessel is placed on the sensing disk 36 that the roller 85 is engaged by the bearing surface 84 in a plane in close proximity to the Invar reaction member 41 with the result that the tendency of the force applied by the bearing member 84 against the roller 85 to tilt the reaction member 41, casing 14 and sensing disk 36 is at a minimum, since the tilting force is transferred through the Invar reaction member in substantially the plane thereof. It may further be seen that the force of the bearing strip 84 against the roller 85 is directly against the equalizing links 51, placing said links in compression to roll about the side walls 45 and reaction member 41 with a minimum amount of friction, which may readily be overcome by the compression spring 46.

When a cooking vessel is placed on the sensing disk 36 and the heater unit 10 is energized to heat the vessel and the material contained therein, the heat of the vessel will tend to expand the sensing disk 36 with respect to the reaction member 41, and the differential in expansion between these members of high and low coefficients of expansion will effect pivotal movement of the rigid levers 57 about the knife edge fulcrum points 65 on said reaction member 41, moving the lowers ends of the rigid levers 57 toward each other and increasing the arches of the buckling strips 66 and 67, as the sensing disk 36 continues to expand. This will effect vertical movement of the pivot 73 for the bell crank 74 and will also effect movement of the bell crank 74 about the pivot 73 in a direction which in Figures 5 and 6, is shown as being a clockwise direction, pivotal movement of said bell crank being amplified by vertical movement of its pivot. The bell crank 73 will in turn direct a force on the roller 85 in a plane close to the plane of the Invar reaction member 41, pivoting the actuator yoke 23 in a clockwise direction and moving the link 24 in a direction, which in Figure 1 is shown as being to the right, to operate the bell crank 26 to depress the plunger 22 and deenergize the heater unit 10 at the temperature setting of the thermostat. It is, of course, understood that in Figure 1 the yoke 23 is facing oppositely from in Figures 5 and 6, and that in Figure 1 the actuator yoke 23 pivots in a counterclockwise direction upon buckling of the strips 66 and 67, to increase the arches thereof.

In the modified form of the invention illustrated in Figures 9 and 10, I have shown a simplified form of sensing device utilizing a single buckling strip 90 in place of the two buckling strips 66 and 67, shown in Figures 5, 6 and 7. In this form of the invention, an Invar reaction member 91, similar to the reaction member 41, is suitably mounted within a hood 92 for the heat sensing and thermal power unit, as in the form of my invention shown in Figures 5 through 8. A sensing disk 93 is spaced above the Invar reaction member 91 on a leg 94 extending upwardly from said reaction member and herein shown as being formed integrally therewith. The leg 94 extends within a downwardly opening recess 95 formed in the bottom of the sensing disk. The under surface of the sensing disk is shown as being ribbed, as indicated by reference character 96, to provide the necessary strength without unduly increasing the mass of the disk, and thus to reduce the heat storage capacity of the disk and to facilitate the heat transfer to and from the bottom of the cooking vessel with a resultant increase in heat response sensitivity of the heat sensing disk 93. The heat sensing disk 93 is also retained in vertically spaced relation with respect to the Invar reaction member 91 by rigid levers 99 and 100. Said levers engage downturned edge portions of the sensing disk at their ends, and are retained to the Invar reaction member by projections 103 and 104, extending inwardly from opposite sides thereof, through registering apertured portions of the rigid levers 99 and 100, respectively. The hood 92, sensing disk 93, Invar reaction member 91, levers 99 and 100 and buckling strip 90, are all yieldably supported on the transverse bridge 44, connected between the walls 45 of the support 13, on the compression spring 46. The lever 99 has a downwardly and angularly inwardly extending arm 105 extending from its lower end having a pivot pin 106 carried thereby, adjacent the inner end thereof. The pivot pin 106 forms a pivot for a bell crank 107, having spaced levers extending inwardly and upwardly and along opposite sides of the buckling strip 90. The levers 109 are connected together by a bridge 110 extending beneath the buckling strip 90 and engaged by a semi-spherical projection 111 depending therefrom. The bell crank 107 also has spaced upwardly extending lever arms 112 connected together adjacent their upper ends by a transverse bearing plate 113 and engaged by a roller 115 on the upper end of a lever arm 116 of an actuating yoke 123, like the actuator yoke 23. The actuating yoke 123 is pivotally mounted between the side plates 45 of the support frame 13 on a transverse pivot pin 124.

Tilting movement of the casing 92, sensing disk 93 and amplifying leverage arrangement, amplifying expansible movement of said sensing disk, is limited by a stop plate 125 mounted on the side walls 45 and projecting beyond said side walls to engage the hood 92 upon rocking movement of said hood and to limit rocking movement of said hood 92, in either direction of tilting thereof.

As a cooking vessel is placed on the sensing disk 93 and the heating unit therefor is turned on to supply heat thereto, said sensing disk will expand as in the form of my invention shown in Figures 5 to 8, inclusive, and the differential in expansion between said sensing disk and the reaction member 91 will increase the arch of the buckling strip 90. This will effect pivotal movement of the actuating yoke 123 in a clockwise direction, effected by rocking movement of the bell crank 109 about the pivot 106. The actuating yoke 123 may be connected to a heater switch or burner valve in a manner similar to which the yoke 23 is connected to the switch 19.

In this form of the invention the slight lateral movement of the pivot 106 will have a negligible influence on the movement transmitted to the actuating yoke 123 through the bearing surface 113 and roller 115. The movement produced by buckling of the buckling strip 90 will also be substantially half the movement produced by buckling of the two buckling strips 66 and 67. The movement produced, however is ample for certain applications.

It should here be understood that while I have shown and described the heat sensing power device of my invention adapted to sense the temperature of the bottom of a cooling vessel, that it may be used for other temperature sensing and control purposes, such as, the sensing of the ambient temperature in an oven or furnace and the like.

It will be understood that various modifications and variations in the present invention may be effected without departing from the spirit and scope of the novel concepts thereof.

I claim as my invention:

1. In an automatic control apparatus, a thermal sensing member adapted to be contacted by a cooking vessel and to receive heat therefrom by thermal conduction, a reaction member connected with said thermal sensing member and having a relatively low coefficient of expansion, a yieldable mounting for said reaction and sensing members accommodating said sensing member to orient itself in accordance with the bottom of a cooking vessel and to have direct contact therewith, a motion multiplying mechanism reacting against said reaction member and having engagement with said sensing member and operated by expansion of said sensing member, and control means mounted independently of said sensing member to remain stationary and unaffected as said sensing member is moved by placing of a cooking vessel thereon, said control means being operatively associated with said motion multiplying mechanism for operation thereby in the control of a cooking temperature.

2. In an automatic control apparatus for cooking and the like, a thermal sensing member adapted to be contacted by a cooking vessel and to receive heat from the vessel by thermal conduction, a reaction member having a negligible coefficient of expansion and being spaced from said thermal sensing member in fixed relation with respect thereto, a yieldable means mounting said reaction and sensing members to accommodate said sensing member to orient itself in accordance with the bottom of a cooking vessel to have direct contact therewith, lever means engaging said sensing member and fulcrumed on said reaction member, biasing means yieldably maintaining said lever means in compressive engagement with said sensing member and deforming upon expansion of said sensing member, and control means mounted independently of said sensing member to remain stationary and unaffected as said sensing member is moved by placing of a cooking vessel thereon, said control means being operatively associated with said biasing means for operation thereby in the control of a cooking temperature.

3. In an automatic control apparatus for cooking, a thermal sensing member arranged to receive heat from a cooking vessel by thermal conduction, said thermal sensing member having a relatively high coefficient of expansion, a reaction member spaced from said thermal sensing member in fixed relation with respect thereto and having a negligible coefficient of expansion, a rockable and yieldable mounting for said sensing member accommodating said sensing member to orient itself in accordance with the bottom of a cooking vessel to have direct contact therewith, a motion multiplying drive connection operated by expansion of said thermal sensing member including two diametrically opposed rigid levers fulcrumed on said reaction member, biasing means engaging said lever with said thermal sensing member to exert a compressive force thereon and deforming upon expansion of said thermal sensing member, and control means mounted independently of said sensing member to remain stationary and unaffected as said sensing member is moved by placing of a cooking vessel thereon, said control means being operatively associated with said biasing means for operation thereby in the control of a cooking temperature.

4. In a differential expansion thermal sensing unit, a sensing disk having a relatively high coefficient of expansion yieldably mounted to be contacted by the bottom of a cooking vessel, a reaction member having a negligible coefficient of expansion spaced from said sensing disk in fixed relation with respect thereto, a rigid lever having rocking engagement with said reaction member and having compressive engagement with said sensing disk, at least one buckling strip engaging said rigid lever with said sensing disk and buckled by rocking movement of said lever effected by expansion of said sensing disk, means for amplifying buckling movement of said buckling strip independently of the positions assumed by said sensing and reacting members by the placing of a cooking vessel on said sensing member comprising a bell crank having one arm engageable with said buckling strip and rocked upon buckling movement thereof and having a second arm extending to a position adjacent said reaction member, and an actuator lever pivoted for movement about an axis spaced a substantial distance from said reaction member and having bearing engagement with said second arm of said bell crank in substantially the plane of said reaction member.

5. In a differential expansion sensing unit for sensing cooking temperatures, a stationary frame, a sensing disk having a high coefficient of expansion adapted to be contacted by the bottom of a cooking vessel, a reaction member having a negligible coefficient of expansion spaced in fixed relation with respect to said sensing disk, spring means supporting said reaction member and sensing disk on said frame for tilting movement together, two diametrically opposed rigid levers fulcruming about said reaction member and having compressive engagement with said sensing disk, said levers having depending arms extending beneath said reaction member and sensing disk, a buckling strip connected between said depending arms and biasing said levers to exert a compressive force on said sensing disk and buckling upon expansible movement of said sensing disk with respect to said reaction member, a motion multiplying power drive connection from said buckling strip comprising a pivoted bell crank lever having one arm operatively engaged by said buckling strip and having a second arm extending upwardly to a position adjacent said reaction member, and an actuator lever pivotally mounted on said frame a substantial distance beneath said reaction member and having bearing engagement with and actuated by said second arm in a plane adjacent the plane of said reaction member.

6. In an automatic control apparatus for surface cooking, a stationary frame, a sensing disk having a high coefficient of expansion, a reaction member having a negligible coefficient of expansion spaced in fixed relation with respect to said sensing disk, spring means supporting said reaction member and sensing disk on said frame for movement together and accommodating said sensing disk to orient itself in accordance with the bottom of a cooking vessel and receive heat therefrom by conduction, two rigid levers mounted to fulcrum about said reaction member and having arms extending upwardly from said reaction member and having engagement with said sensing disk at diametrically opposed points, and also having depending arms extending a substantial distance beneath said reaction member, two buckling strips connected between said depending arms and bowed to buckle in opposite directions upon movement of said depending arms toward each other and maintaining said levers in compressive engagement with said sensing disk, and a single amplifying power drive connection from said buckling strips comprising a support movable with one of said buckling strips, lever means pivotally carried by said support, and an actuating lever driven by said lever means in a plane adjacent said reaction member.

7. In a differential expansion heat sensing unit, a sensing disk having a relatively high coefficient of expansion adapted to be contacted by and to orient itself in accordance with the bottom of a cooking vessel and to receive heat therefrom by conduction, a reaction member spaced beneath said sensing disk in fixed relation with respect thereto and having a negligible coefficient of expansion, a support for said reaction member and sensing disk including a support frame and a spring yieldably supporting said reaction member on said frame, two diametrically opposed rigid levers fulcrumed intermediate their ends on said reaction member and having compressive engagement with said sensing disk at their upper ends and having depending arms depending a substantial distance beneath said reaction member, two buckling strips connected between said depending arms adjacent the lower ends thereof and maintaining said levers in compressive engagement with said sensing disk and buckling in opposite directions upon movement of said levers toward each other, and a single motion multiplying leverage drive connection from said buckling strips, for supplying power to shut-off a source of heat to the cooking vessel in association with said sensing disk, comprising a yoke having connection with one of said buckling strips for vertical movement therewith upon buckling thereof, an amplifying lever pivoted on said yoke and having one arm operatively engaged by the other of said buckling strips and a second arm terminating adjacent said reaction member, and an actuating lever engaged by said amplifying lever adjacent said reaction member and operated thereby upon bowing of said buckling strips away from each other.

8. In a differential expansion heat sensing unit, a generally vertically extending hood, a reaction member extending across said hood and supported thereon in vertically spaced relation with respect to the top thereof, a support frame adapted to be supported beneath the top of a cooking range, a spring supporting said reaction member and hood on said support frame for yieldable and tilting movement with respect thereto, a sensing disk extending across the open top of said hood, means supporting said sensing disk on said reaction member for tilting movement with said reaction member and casing to accommodate said sensing member to orient itself in accordance with the bottom of a cooking vessel and receive heat therefrom by conduction, two diametrically opposed rigid levers fulcrumed intermediate their ends on said reaction member and having compressive engagement with said sensing disk at diametrically opposed points at their upper ends and having depending arms depending from the fulcrums thereof, two oppositely bowed buckling strips connected between the depending arms of said rigid levers and maintaining said levers in compressive engagement with said sensing disk, an amplifying power drive connection from said buckling strips comprising a yoke secured to one of said buckling strips adjacent the center thereof for vertical movement therewith, means guiding said yoke for vertical movement with said buckling strip, a bell crank pivoted on said yoke and having one arm having bearing engagement with the other of said buckling strips and a second arm extending upwardly therefrom to a position adjacent said reaction member, an actuator lever pivoted to said frame beneath said reaction member and having an arm extending upwardly from the pivot of said actuator lever to a position adjacent said reaction member and having slidable bearing engagement with said second arm of said bell crank, to be operated thereby, and equalizing guide means connected between said support and reaction member for rocking movement therewith and placed under compression by the force of said bell crank acting on said actuating lever, to stabilize said reaction member and sensing disk and avoid the tendency of the operating forces exerted against said actuator lever to tilt said hood and reaction member and thereby avoiding binding of said rigid levers, buckling strips and bell crank.

9. In a differential expansion thermal sensing unit, a sensing disk having a relatively high coefficient of expansion, yieldably mounted to be contacted by and to orient itself in accordance with the bottom of a cooking vessel, a reaction member having a negligible coefficient of expansion spaced from said sensing disk in fixed relation with respect thereto, a rigid lever having rocking engagement with said reaction member and compressive engagement with said sensing disk, a buckling strip engaging said rigid lever with said sensing disk and buckled by rocking movement of said lever effected by expansion of said sensing disk with respect to said reaction member, amplifying means for multiplying buckling movement of said buckling strip, an actuator lever operated by said amplifying means, a link having pivotal connection with said actuator lever and actuated thereby, a shut-off device for shutting off a source of heat for a vessel on said sensing disk, a bell crank having pivotal connection with said link and pivoted upon rectilinear movement thereof and having an arm engageable with said shut-off device to operate the same, and spring means connected with said arm of said bell crank and biasing said bell crank in retracted relation with respect to said shut-off device and also biasing said actuator lever and motion multiplying means into engagement with said buckling strip.

10. In a differential expansion sensing unit, a sensing disk adapted to be contacted by and to orient itself in accordance with the bottom of a cooking vessel and having a relatively high coefficient of expansion, a reaction member spaced from said sensing disk in fixed relation with respect thereto and having a negligible coefficient of expansion, a lever engaging said sensing disk and having rocking engagement with said reaction member to fulcrum thereabout, a buckling strip engaging said lever and biasing said lever into engagement with said sensing disk, amplifying means for multiplying the buckling movement of said buckling strip upon expansion of said sensing disk, an actuator lever operated by said amplifying means, means connected with said actuator lever for shutting off a source of heat for a vessel on said sensing disk comprising a link connected to said actuator lever, a shut-off device, a shut-off lever for operating said shut-off device, a pivoted arm, a pivotal support for said shut-off lever on said arm, cam means selectively operable to rock said pivoted arm and vary the position of said shut-off lever with respect to said shut-off device and the temperature of operation of said shut-off device, a pivotal connection from said link to said shut-off lever, and spring means biasing said shut-off lever in retracted relation with respect to said shut-off device and biasing said actuator lever into engagement with said amplifying means.

11. In a differential expansion heat sensing unit, a stationary frame, a thermal sensing member movably mounted on said frame and having a high coefficient of expansion, a reaction member mounted on said frame and having a negligible coefficient of expansion spaced in fixed relation with respect to said sensing member, two diametrically opposed rigid levers fulcruming about said reaction member and having compressive engagement with said sensing member, said levers having depending arms extending beneath said reaction member and said sensing member, two oppositely bowed buckling strips connected between said depending lever arms and biasing said levers to exert a compressive force on said sensing member and buckling upon expansible movement of said sensing member, and a motion multiplying drive connection from said buckling strips for multiplying the motion thereof and supplying the power necessary to shut-off a source of heat.

12. In a differential expansion heat sensing unit, a thermal sensing member having a high coefficient of expansion, a reaction member having a negligible coefficient of expansion spaced from said thermal sensing member in fixed relation with respect thereto, two diametrically opposed rigid levers fulcruming about said reaction member and having compressive engagement with said sensing member, said levers having depending arms extending beneath said reaction member and said sensing member, at least one bowed buckling strip connected between said depending lever arms and biasing said levers to exert a compressive force on said sensing member and buckling upon expansible movement of said sensing member, and a motion multiplying drive connection from said buckling strip for multiplying the motion thereof and supplying the power necessary to shut-off a source of heat.

References Cited in the file of this patent
UNITED STATES PATENTS

| | | |
|---|---|---|
| Re. 18,531 | Kay | July 19, 1932 |
| 2,044,822 | Vaughn | June 23, 1936 |
| 2,057,496 | Lumsden | Oct. 13, 1936 |
| 2,140,947 | Andersson | Dec. 20, 1938 |
| 2,500,061 | Clark | Mar. 7, 1950 |
| 2,641,667 | Shivers | June 9, 1953 |
| 2,666,836 | Stiebel | Jan. 19, 1954 |
| 2,699,487 | Turner | Jan. 11, 1955 |